(12) United States Patent
Mutoh

(10) Patent No.: US 7,268,828 B2
(45) Date of Patent: Sep. 11, 2007

(54) TELEVISION RECEIVER AND CONTROL METHOD THEREOF FOR DISPLAYING VIDEO SIGNALS BASED ON DIFFERENT TELEVISION MODES

(75) Inventor: Yasuhiko Mutoh, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 422 days.

(21) Appl. No.: 10/875,499

(22) Filed: Jun. 25, 2004

(65) Prior Publication Data

US 2004/0263688 A1    Dec. 30, 2004

(30) Foreign Application Priority Data

Jun. 30, 2003    (JP)    ............... 2003-188705

(51) Int. Cl.
   *H04N 5/46*    (2006.01)
   *H04N 5/268*    (2006.01)
   *H04N 5/76*    (2006.01)

(52) U.S. Cl. ............ 348/555; 348/448; 348/558; 348/705

(58) Field of Classification Search ........ 348/554–556, 348/558, 552, 705, 706, 837, 838, 231.7, 348/376, 448, 452; 715/718; 455/556.1
See application file for complete search history.

(56) References Cited

U.S. PATENT DOCUMENTS

| 5,218,436 | A | * | 6/1993 | Sugiyama et al. | 348/445 |
| 5,594,552 | A | * | 1/1997 | Fujinami et al. | 386/131 |
| 5,610,661 | A | * | 3/1997 | Bhatt | 348/446 |
| 6,037,990 | A | * | 3/2000 | Ogawa et al. | 348/452 |
| 6,256,069 | B1 | * | 7/2001 | Rosen et al. | 348/448 |
| 6,366,329 | B1 | * | 4/2002 | Oh | 348/744 |
| 6,784,942 | B2 | * | 8/2004 | Selby et al. | 348/452 |
| 6,943,845 | B2 | * | 9/2005 | Mizutome et al. | 348/555 |
| 7,129,990 | B2 | * | 10/2006 | Wredenhagen et al. | 348/449 |
| 2002/0055278 | A1 | | 5/2002 | Lee et al. | |

(Continued)

FOREIGN PATENT DOCUMENTS

JP    03-218192    9/1991

(Continued)

OTHER PUBLICATIONS

Chinese Office Action dated Sep. 8, 2006 for Appln. No. 200410061772.2.

(Continued)

*Primary Examiner*—Victor R. Kostak
(74) *Attorney, Agent, or Firm*—Pillsbury Winthrop Shaw Pittman, LLP

(57) ABSTRACT

A television receiver includes a switching portion which receives each of a video signal received and obtained by an antenna and a video signal read from a storage medium, and selectively outputs one of the video signals in response to an instruction signal for output selection, a detection portion which detects a mode of a video signal, a selection/control portion which supplies the instruction signal for output selection to the switching portion, and outputs a detection result corresponding to a preset specific mode from the detection portion, a signal processing portion which applies sequential scanning conversion processing to the video signal selected and output by the switching portion, and a display portion which displays the video signal subjected to the sequential scanning conversion processing.

12 Claims, 7 Drawing Sheets

U.S. PATENT DOCUMENTS

2002/0140852 A1* 10/2002 Miller et al. ............... 348/441
2003/0189667 A1* 10/2003 Chow ........................ 348/441
2005/0231641 A1* 10/2005 Suito ........................ 348/555
2006/0146188 A1*  7/2006 Estrop ...................... 348/448

FOREIGN PATENT DOCUMENTS

| JP | 2000-278650 | 10/2000 |
|----|-------------|---------|
| JP | 2002-10219  | 1/2002  |
| JP | 2002-57993  | 2/2002  |
| JP | 2003-116109 | 4/2003  |
| JP | 2003-125359 | 4/2003  |

OTHER PUBLICATIONS

Japanese Office Action dated May 29, 2007 for Appln. No. 2003-188705.

* cited by examiner

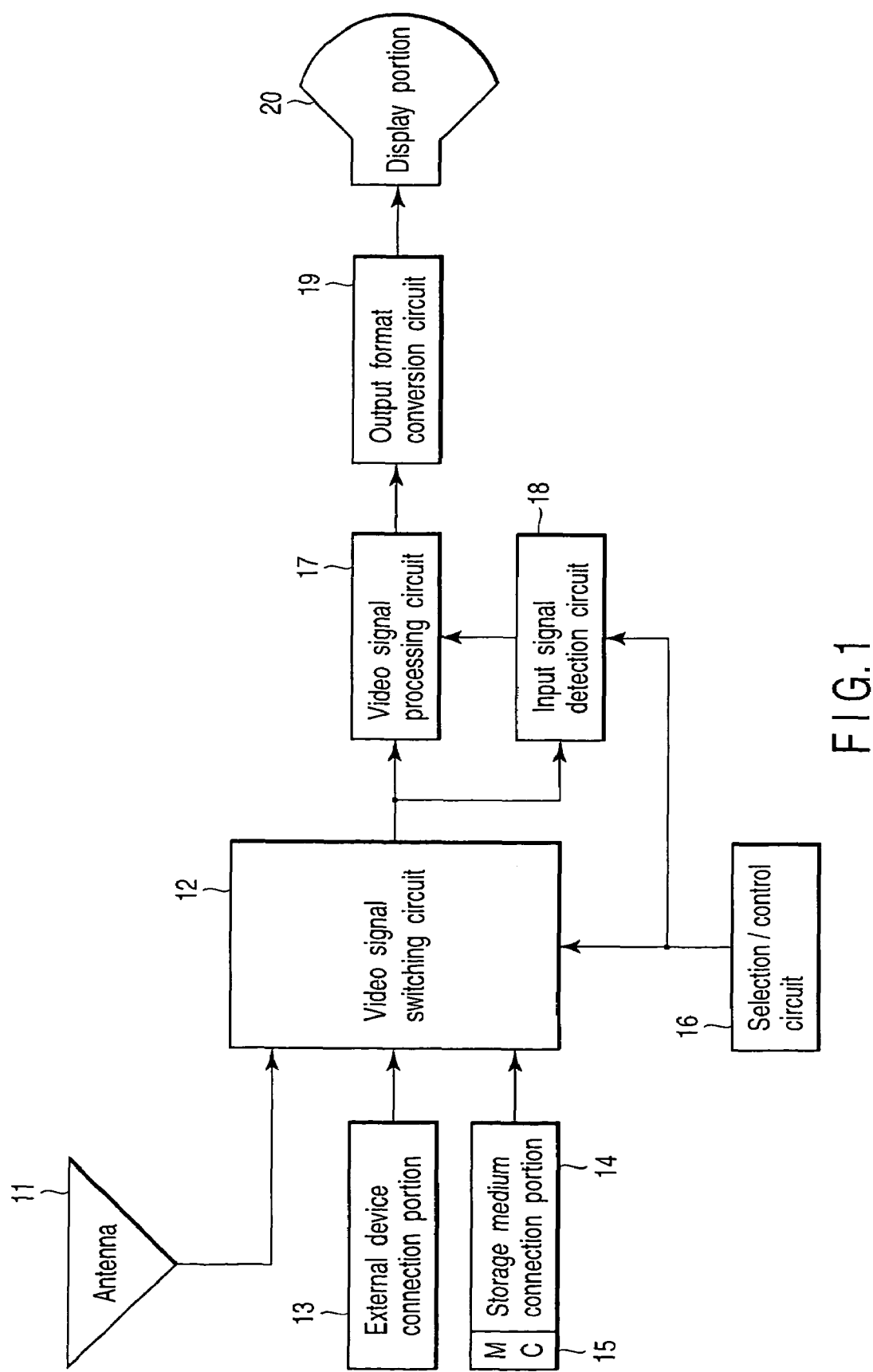
F I G. 1

TELEVISION RECEIVER AND CONTROL METHOD THEREOF FOR DISPLAYING VIDEO SIGNALS BASED ON DIFFERENT TELEVISION MODES

CROSS-REFERENCE TO RELATED APPLICATIONS

This application is based upon and claims the benefit of priority from prior Japanese Patent Application No. 2003-188705, filed Jun. 30, 2003, the entire contents of which are incorporated herein by reference.

BACKGROUND OF THE INVENTION

1. Field of the Invention

The present invention relates to a television receiver including a function to attach a detachable portable storage medium to, e.g., a digital camera and display a video signal recorded therein on a screen, and a control method thereof.

2. Description of the Related Art

As is well known, a portable memory card having a built-in semiconductor memory is detachable in a digital camera. Further, in the digital camera, an optical image of a photographed object is converted into an electrical video signal and stored in the memory card. In this case, the video signal stored in the memory card is based on a progressive mode.

Furthermore, there has been developed a television receiver which has a function to attach such a memory card and display a video signal recorded therein on a screen. This television receiver converts a video signal read from the memory card into a signal based on the interlaced mode of the NTSC (National Television System Committee) standard, and displays it on a CRT (cathode ray tube).

Moreover, in this television receiver, sequential scanning conversion processing can be applied to video signals converted into signals based on the interlaced mode in order to convert them to video signals based on the progressive mode, thereby enhancing the quality of displayed images.

Here, when a video signal read from the memory card is still picture video, sequential scanning conversion processing to combine video signals of adjacent fields after interlace conversion is applied, thereby displaying a still picture image with the grade of the original video recorded in the memory card.

On the other hand, when a video signal read from the memory card is a moving picture video, since sequential scanning conversion processing based on scanning line interpolation is applied to each field after interlace conversion, there occurs a problem that the grade of a video to be displayed is degraded.

This problem is visually confirmed by a user as an out-of-focus feeling that a contour becomes blurred in a vertical direction of a screen or a jagged feeling that a diagonal line is stepped. Additionally, this problem likewise occurs when displaying a moving picture video created by applying editing processing such as slides, thumbnails, zooming and others to a video signal recorded in the memory card.

Jpn. Pat. Appln. KOKAI Publication No. 2002-10219 discloses that sequential double-speed conversion or field double-speed conversion is carried out in such a manner that a high-quality video can be displayed with less flicker obstructions in accordance with a video signal format based on a television mode and a type of a display monitor when displaying video signals based on different television modes, but it does not have any description about solving the above-described problem.

BRIEF SUMMARY OF THE INVENTION

According to one aspect of the present invention, there is provided a television receiver comprising: a switching portion which receives each of a video signal received and obtained by an antenna and a video signal read from a storage medium, and selectively outputs one of the video signals in response to an instruction signal for output selection; a detection portion which detects a mode of a video signal selected and output by the switching portion; a selection/control portion which supplies the instruction signal for output selection to the switching portion, and outputs a detection result corresponding to a preset specific mode from the detection portion when the instruction signal is a signal which is used to select the video signal read from the storage medium; a signal processing portion which applies sequential scanning conversion processing corresponding to the mode detected by the detection portion to the video signal selected and output by the switching portion; and a display portion which displays the video signal subjected to the sequential scanning conversion processing in the signal processing portion.

According to another aspect of the present invention, there is provide a control method of a television receiver, comprising: selectively switching and outputting a video signal received and obtained by an antenna and a video signal read from a storage medium in response to an output instruction signal; outputting a detection result by detecting a mode of a selected and output video signal, and outputting a detection result corresponding to a preset specific mode when the video signal read from the storage medium is selected and output based on the output instruction signal; applying sequential scanning conversion processing corresponding to the detected mode to the selected and output video signal; and displaying the video signal subjected to the sequential scanning conversion processing.

BRIEF DESCRIPTION OF THE SEVERAL VIEWS OF THE DRAWING

FIG. 1 is a block diagram showing an embodiment according to the present invention in order to explain a television receiver;

DETAILED DESCRIPTION OF THE INVENTION

Figure 2:
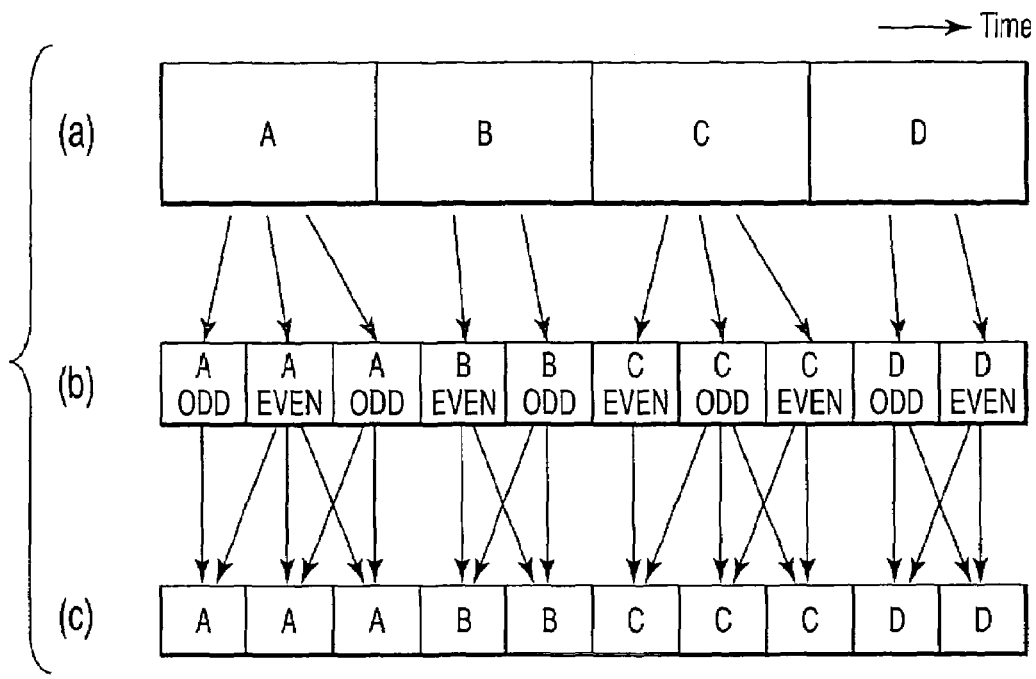
FIG. 2 is a view illustrating a 3-2 pull-down mode of a video signal to be input to the television receiver.

An embodiment according to the present invention will now be described in detail hereinafter with reference to the accompanying drawings. FIG. 1 shows a television receiver described in this embodiment. That is, this television receiver supplies a television signal received by an antenna 11 to a video signal switching circuit 12.

Further, this television receiver has an external device connection portion 13. This external device connection portion 13 enables arbitrary connection with a non-illustrated external device which can output a video signal, supplies video signals based on various modes fed from a connected external device to the video signal switching circuit 12.

Furthermore, this television receiver has a storage medium connection portion 14. This storage medium connection portion 14 enables attachment of a memory card 15 which is used in, e.g., a digital camera, reads a video signal from the attached memory card 15, converts it into a signal based on an interlace mode, and supplies it to the video signal switching circuit 12.

Moreover, the video signal switching circuit 12 selectively switches video signals supplied from the external device connection portion 13 and the storage medium connection portion 14 based on a selection/control signal output from a selection/control circuit 16, and outputs switched signals to a video signal processing circuit 17 and an input signal detection circuit 18.

Of these circuits, the input signal detection circuit 18 has a function to detect a mode of an inputted video signal. For example, it detects a still picture video and a moving picture video based on a 3-2 pull-down mode used in movie sources or the like in an NTSC sphere (video vertical frequency: 60 Hz), a 2-2 pull-down mode used in movies, cards, graphic sources or the like in a PAL (Phase Alternation by Line) color television sphere, and a regular interlace mode other than these modes.

Here, the 3-2 pull-down mode means that three fields and two fields based on the interlaced mode are alternately generated as indicated by reference character (b) in FIG. 2 from a plurality of video frames A, B, C, D, . . . which are continuous in time as indicated by reference character (a) in the drawing and the generated fields are transmitted.

A video signal transmitted based on such a 3-2 pull-down mode is converted into three frames and two frames based on a progressive mode and subjected to video display by performing reverse 3-2 pull-down conversion by which adjacent fields are combined with each other based on a fixed rule as indicated by reference character (c) in FIG. 2 on the reception side.

Figure 3:
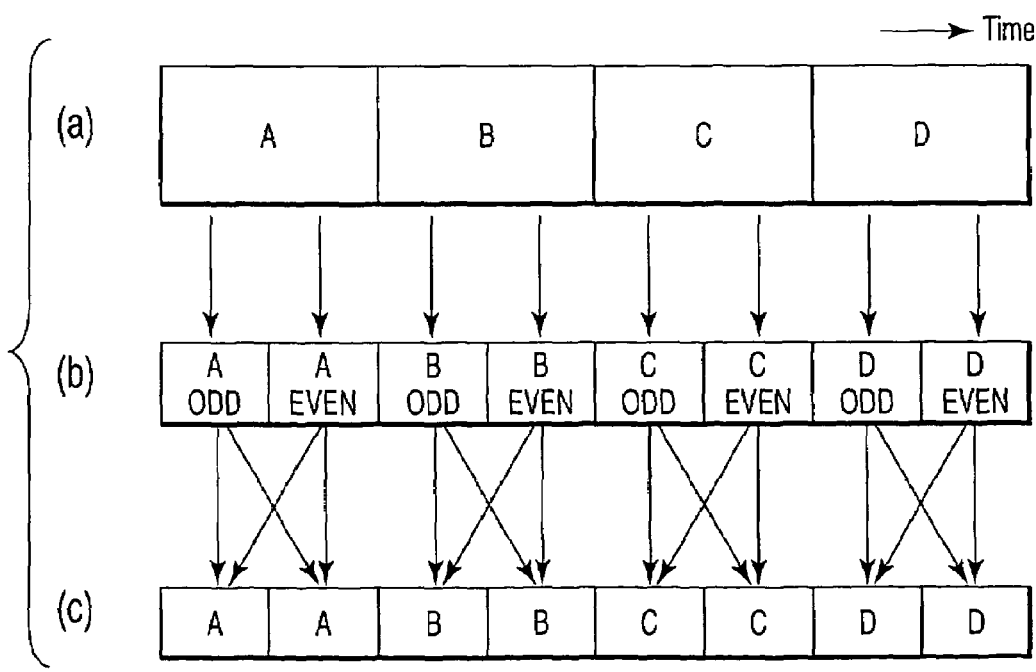
FIG. 3 is a view illustrating a 2-2 pull-down mode of a video signal to be input to the television receiver.

Additionally, the 2-2 pull-down mode means that two fields based on the interlace mode is generated as indicated by reference character (b) in FIG. 3 from each of a plurality of video frames A, B, C, D, . . . which are continuous in time as indicated by reference character (a) in the drawing and the generated fields are transmitted.

A video signal transmitted based on such a 2-2 pull-down mode is converted into two frames based on the progressive mode and subjected to video display by performing reverse 2-2 pull-down conversion by which adjacent fields are combined with each other based on a fixed fuel as indicated by reference character (c) in FIG. 3 on the reception side.

Further, the video signal processing circuit 17 executes sequential scanning conversion processing based on a detection result of the input signal detection circuit 18 to the input video signal. That is, it executes the reverse 3-2 pull-down conversion processing when the input video signal is based on the 3-2 pull-down mode, the reverse 2-2 pull-down conversion processing when the input video signal is based on the 2-2 pull-down mode, and sequential scanning conversion processing according to a still picture video or movement adaptation sequential scanning conversion processing according to a moving picture video when the input video signal is based on any other interlaced mode.

The video signal subjected to the sequential scanning conversion processing by the video signal processing circuit 17 in this manner is supplied to an output format conversion circuit 19, converted into a conformation according to a predetermined display format, supplied to a display portion 20 such as a CRT and subjected to video display.

Here, a selection/control signal outputted from the selection/control circuit 16 is also supplied to the input signal detection circuit 18. When the input selection/control signal is used to select a video signal output from the storage medium connection portion 14, this input signal detection circuit 18 outputs a detection signal indicating that the 2-2 pull-down mode has been detected to the video signal processing circuit 17, and operates to causes the video signal processing circuit 17 to forcibly perform the reverse 2-2 pull-down conversion processing.

Figure 4:
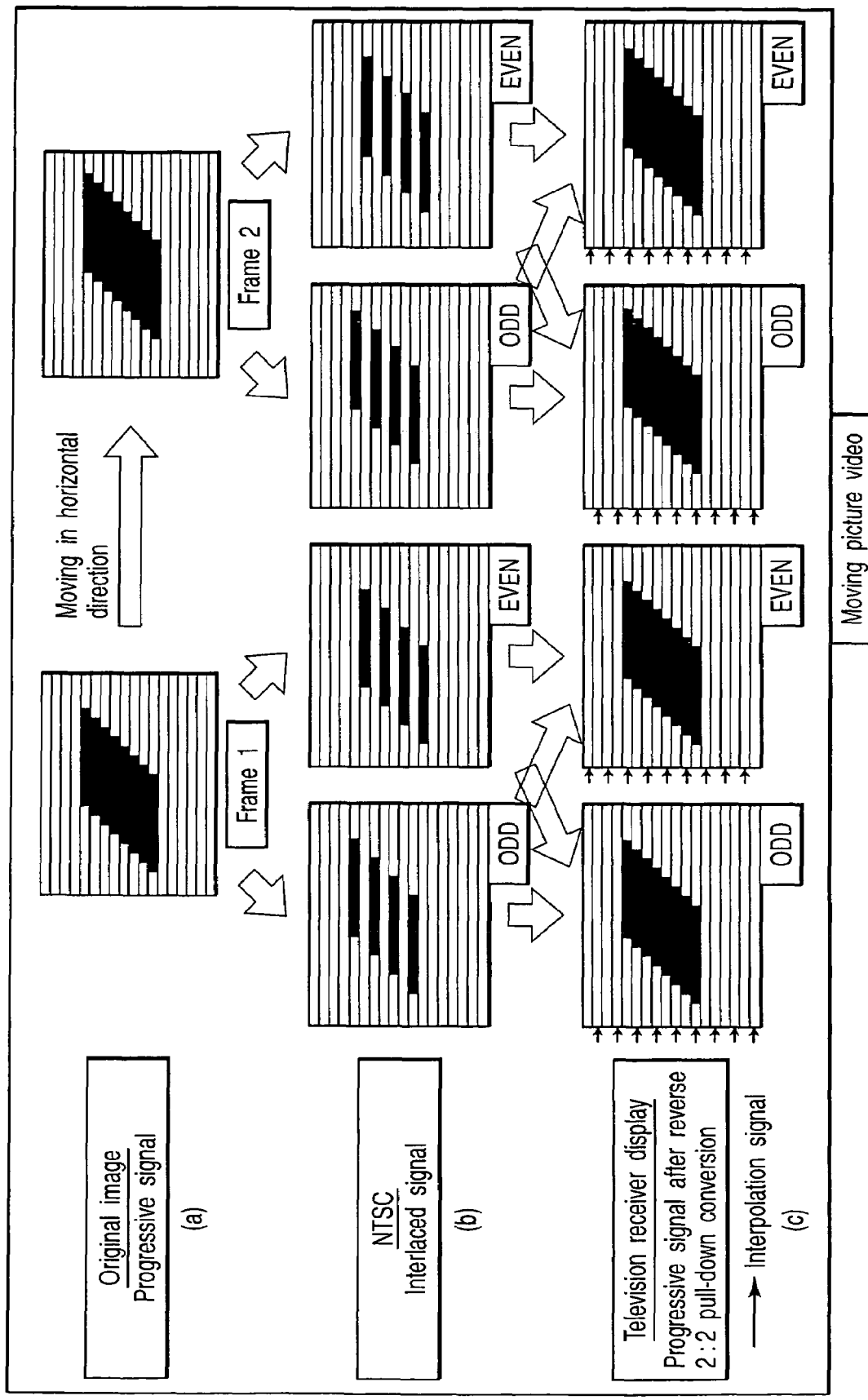
FIG. 4 is a view illustrating a processing operation of a moving picture video signal in the television receiver.

Assuming that a moving picture video signal based on the progressive mode such as indicated by reference character (a) in FIG. 4 is stored in the memory card 15, this moving picture video signal is read by the storage medium connection portion 14, converted into a video signal based on the interlaced mode such as indicated by reference character (b) in FIG. 4, and output to the video signal switching circuit 12.

When the selection/control signal which causes the video signal switching circuit 12 to select an output video signal of the storage medium connection portion 14 is output from the selection/control circuit 16 in such a state, the video signal processing circuit 17 forcibly executes the reverse 2-2 pull-down conversion processing to the input video signal.

That is, the video signal processing circuit 17 combines adjacent fields with each other based on a fixed rule as indicated by reference character (c) in FIG. 4 with respect to the video signal based on the interlaced mode indicated by reference character (b) in FIG. 4, converts it into a video signal based on the progressive mode, and outputs the converted signal. As a result, it is possible to obtain the moving picture video signal with the high image quality which has the same level as that of the original video indicated by reference character (a) in FIG. 4.

Figure 5:
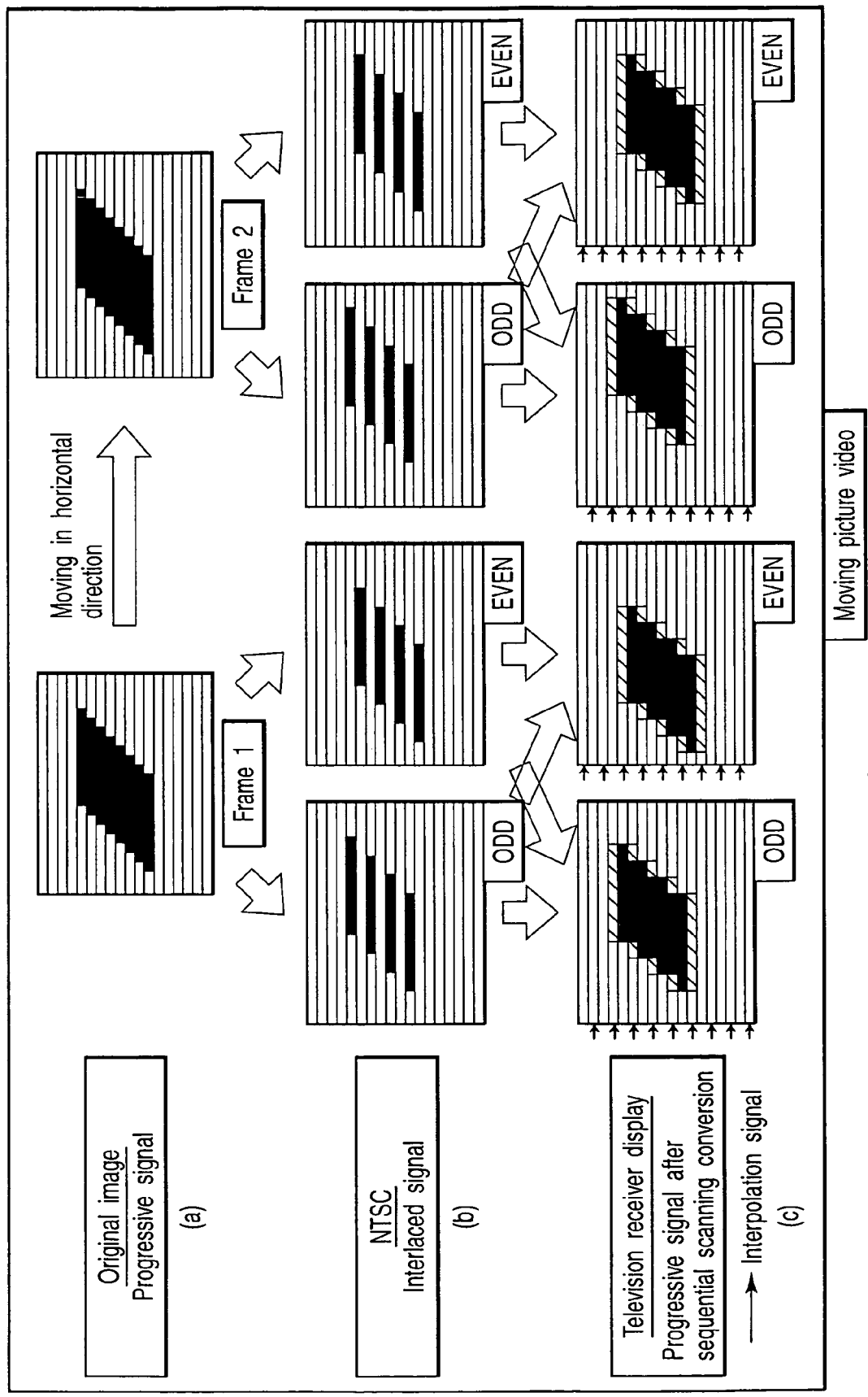
FIG. 5 is a view illustrating a processing operation of the moving picture video signal in a current television receiver.

In regard to this point, in a current television receiver, sequential scanning conversion processing based on scanning line interpolation is applied when converting a moving picture video signal based on the progressive mode indicated by reference character (a) in FIG. 5 into a video signal based on the interlaced mode indicated by reference character (b) in FIG. 5 and converting a video signal in each field into a signal based on the progressive mode.

In this scanning line interpolation, since an interpolation signal is generated by using an average value of signals of upper and lower lines in that field, the interpolation signal is a black signal when both the upper and lower lines have black signals, the interpolation signal is a white signal when both the upper and lower lines have white signals, and the interpolation signal is a gray signal when the upper and lower lines have a black signal and a white signal.

Therefore, as indicated by oblique lines at reference character (c) in FIG. 5, an out-of-focus feeling that a contour becomes blur in a vertical direction of a screen or a jagged feeling that a diagonal line is stepped appears in the video signal converted into a signal based on the progressive mode, and an image quality is degraded.

Figure 6:
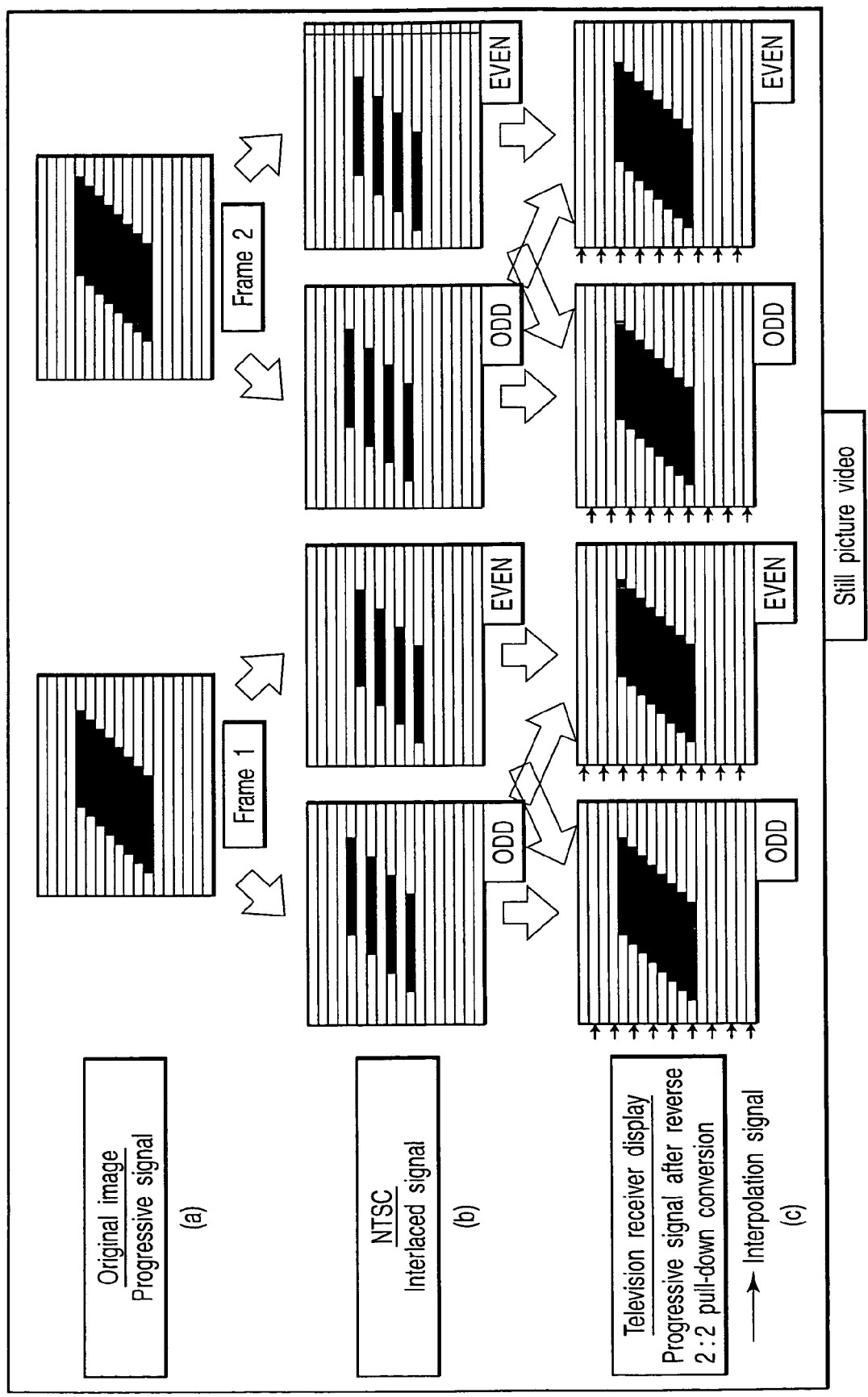
FIG. 6 is a view illustrating a processing operation of a still picture video signal in the television receiver according to the embodiment.

Further, such a still picture video signal based on the progressive mode as indicated by reference character (a) in FIG. 6 is recorded in the memory card 15. When this still picture video signal is read by the storage medium connection portion 14, converted into such a video signal based on the interlaced mode as indicated by reference character (b)

in FIG. 6 and output to the video signal switching circuit 12, the video signal processing circuit 17 is likewise caused to execute the reverse 2-2 pull-down conversion processing.

As a result, with respect to the video signal based on the interlaced mode indicated by reference character (b) in FIG. 6, adjacent fields are combined with each other based on a fixed rule and a video signal based on the progressive mode can be generated as indicated by reference character (c) in FIG. 6.

Figure 7:
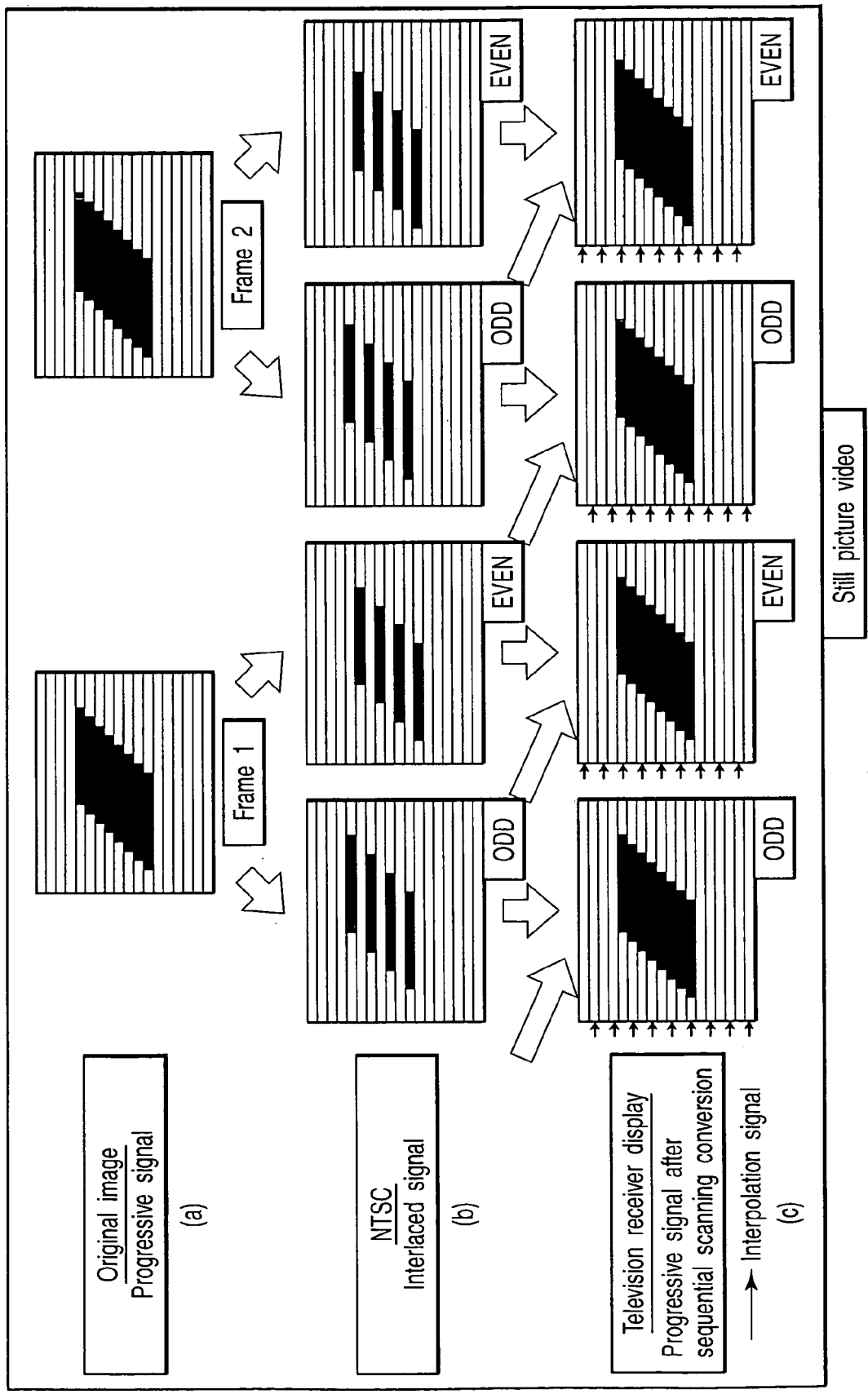
FIG. 7 is a view illustrating a processing operation of a still picture video signal in a current television receiver.

It is to be noted that, in the current television receiver, sequential scanning conversion processing by which adjacent fields are combined with each other is applied as indicated by reference character (c) in FIG. 7 when converting a still picture video signal based on the progressive mode indicated by reference character (a) in FIG. 7 into a video signal based on the interlaced mode indicated by reference character (b) in FIG. 7 and converting this video signal into a signal based on the progressive mode.

Figure 8:
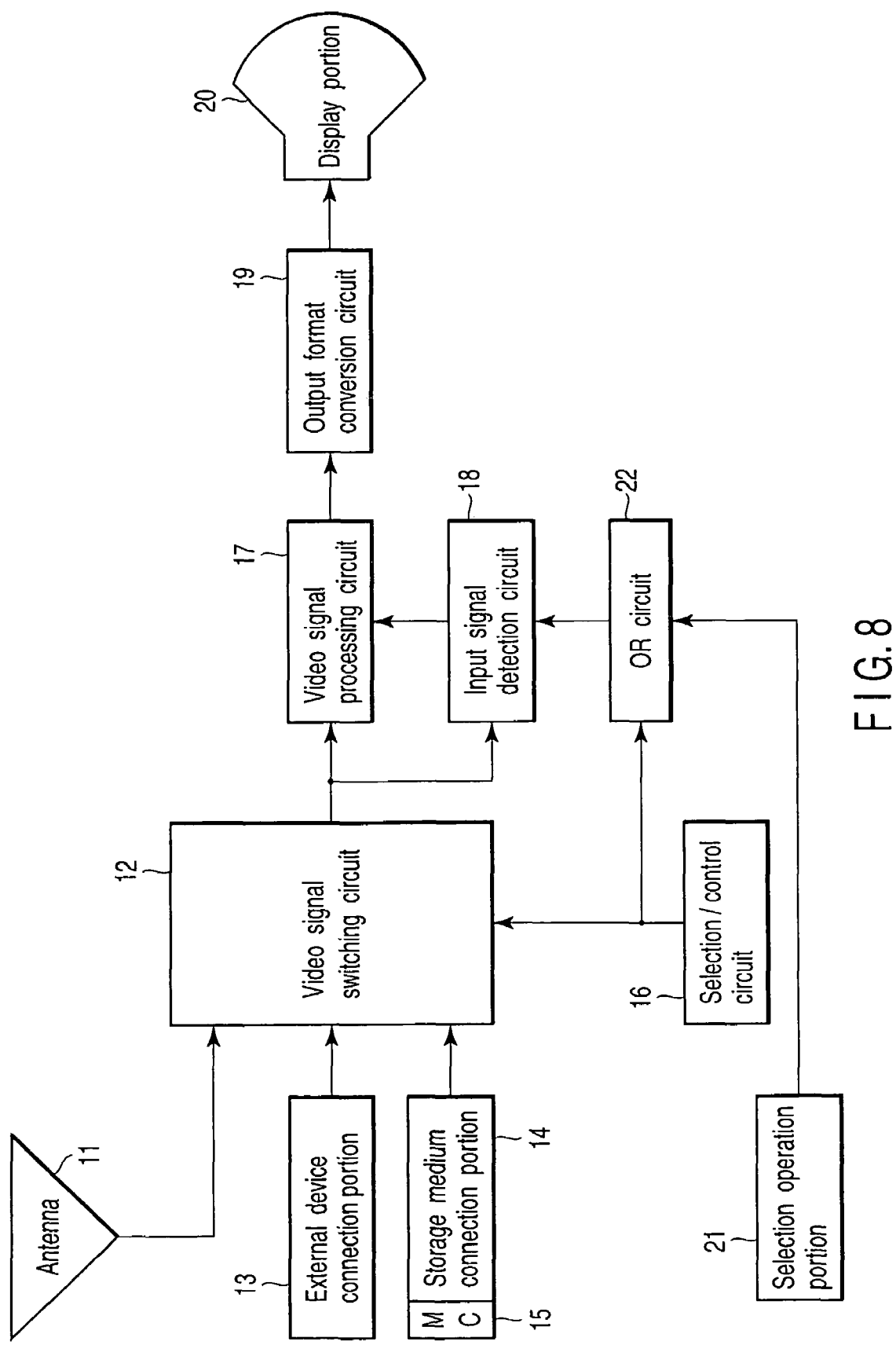
FIG. 8 is a block diagram illustrating a modification of the embodiment.

FIG. 8 shows a modification of the foregoing embodiment. In FIG. 8, giving a description with like reference numerals denoting parts equal to those in FIG. 1, a selection/control signal output from the selection/control circuit 16 and an operation signal output from a selection operation portion 21 operated by a user are supplied to the input signal detection circuit 18 through an OR circuit 22.

Furthermore, when the selection/control signal used to select an output video signal from the storage medium connection portion 14 is output from the selection/control circuit 16 or when the operation signal is output from the selection operation portion 21, the input signal detection circuit 18 outputs a detection signal indicating that the 2-2 pull-down mode has been detected is output to the video signal processing circuit 17, and operates to causes the video signal processing circuit 17 to forcibly execute the reverse 2-2 pull-down conversion processing.

That is, the video signal processing circuit 17 can be used to apply the reverse 2-2 pull-down conversion processing to not only the video signal recorded in the memory card 15 but a television signal received by the antenna 11 or a video signal supplied from an external device connected to the external device connection portion 13 according to needs of users.

By doing so, when the 2-2 pull-down mode cannot be correctly detected by the input signal detection circuit 18 due to mixing of noise or the like even though a video signal supplied to the video signal processing circuit 17 is based on the 2-2 pull-down mode and the supplied signal is judged as a regular moving picture video signal, a user can operate the selection operation portion 21 in order to cause the video signal processing circuit 17 to forcibly execute the reverse 2-2 pull-down conversion processing, which is effective.

It is to be noted that the present invention is not restricted to the foregoing embodiment, and constituent elements can be modified and embodied in many ways without departing from the scope on the embodying stage. Moreover, various inventions can be formed by appropriately combining a plurality of constituent elements disclosed in the foregoing embodiment. For example, some constituent elements can be eliminated from all the constituent elements disclosed in the embodiment. Additionally, constituent elements according to different embodiments may be appropriately combined.

What is claimed is:

1. A television receiver comprising:
    a switching portion which receives each of a video signal received and obtained by an antenna and a video signal read from a storage medium, and selectively outputs one of the video signals in response to an instruction signal for output selection;
    a detection portion configured to receive a video signal selected and output by the switching portion and to detect a mode of the received video signal;
    a selection/control portion configured to supply the instruction signal for output selection to the switching portion, and to forcibly cause the detection portion to output a detection result corresponding to a preset specific mode without permitting the detection portion to detect the mode of the received video signal, when the instruction signal is a signal for selecting the video signal read from the storage medium;
    a signal processing portion which applies sequential scanning conversion processing corresponding to the mode detected by the detection portion to the video signal selected and output by the switching portion; and
    a display portion which displays the video signal subjected to the sequential scanning conversion processing in the signal processing portion.

2. A television receiver according to claim 1, wherein the signal processing portion can execute:
    first sequential scanning conversion processing to convert a still picture video signal based on an interlaced mode into a still picture video signal based on a progressive mode;
    movement adaptation type second sequential scanning conversion processing to convert a moving picture video signal based on the interlaced mode into a moving picture video signal based on the progressive mode; and
    third sequential scanning conversion processing to apply reverse 2-2 pull-down conversion processing to a moving picture video signal based on a 2-2 pull-down mode in order to convert it into a moving picture video signal based on the progressive mode.

3. A television receiver according to claim 2, wherein the selection/control portion causes the detection portion to output a detection result corresponding to a moving picture video signal based on the 2-2 pull-down mode when the selection/control portion outputs an instruction signal used to select a video signal read from the storage medium, and causes the signal processing portion to execute the reverse 2-2 pull-down conversion processing.

4. A television receiver according to claim 1, further comprising:
    An operation portion which causes the detection portion to output a detection result corresponding to the present specific mode irrespective of a control of the selection/control portion.

5. A television receiver according to claim 4, wherein the operation portion causes the signal processing portion to execute the reverse 2-2 pull-down conversion processing by causing the detection portion to output a detection result corresponding to a moving picture video signal based on the 2-2 pull-down mode.

6. A television receiver according to claim 1, wherein the storage medium is a memory card.

7. A television receiver comprising:
    a switching portion which receives each of a video signal received and obtained by an antenna and a video signal read from a storage medium, and selectively outputs one of the video signals in response to an instruction signal for output selection;

a detection portion configured to receive a video signal selected and output by the switching portion and to detect a mode of the received video signal;

a selection/control portion configured to supply the instruction signal for output selection to the switching portion, and to forcibly cause the detection portion to output a detection result corresponding to a moving picture video based on a 2-2 pull-down mode without permitting the detection portion to detect the mode of the received video signal, when the instruction signal is a signal for selecting the video signal read from the storage medium;

a signal processing portion which applies to a video signal selected and output by the switching portion first sequential scanning conversion processing to convert a still picture video signal based on an interlaced mode into a still picture video signal based on a progressive mode, movement adaptation type second sequential scanning conversion processing to convert a moving picture video signal based on the interlaced mode into a moving picture video signal based on the progressive mode, and third sequential scanning conversion processing to apply reverse 2-2 pull-down conversion processing to a moving picture video signal based on a 2-2 pull-down mode in order to convert it into a moving picture video signal based on the progressive mode; and a display portion which displays a video signal subjected to the sequential scanning conversion processing in the signal processing portion.

8. A control method of a television receiver, comprising:

selectively switching and outputting a video signal received an obtained by an antenna and a video signal read from a storage medium in response to an output instruction signal;

inputting the selected and output video signal to a detection portion which detects a mode of the input video signal, causing the detection portion to detect the mode, and forcibly causing, when the video signal read from the storage medium is selected and output in response to the output instruction signal, the detection portion to output a detection result corresponding to a preset specific mode without permitting the detection portion to detect the mode of the received video signal;

applying sequential scanning conversion processing corresponding to the detected mode to the selected and output video signal; and displaying the video signal subjected to the sequential scanning conversion processing.

9. A control method of a television receiver according to claim 8, wherein the sequential scanning conversion processing includes:

sequential scanning conversion processing to convert a still picture video signal based on an interlaced mode into a still picture video signal based on a progressive mode;

movement adaptation type sequential scanning conversion processing to convert a moving picture video signal based on the interlaced mode into a moving picture video signal based on the progressive mode; and sequential scanning conversion processing to apply reverse 2-2 pull-down conversion processing to a moving picture video signal based on a 2-2 pull-down mode in order to convert it into a moving picture video signal based on the progressive mode.

10. A control method of a television receiver according to claim 8, wherein the preset specific mode is a 2-2 pull-down mode.

11. A control method of a television receiver according to claim 8, further comprising:

Outputting a detection result corresponding to the preset specific mode by an external operation irrespective of the output instruction signal.

12. A control method of a television receiver according to claim 11, wherein a detection result corresponding to a moving picture video signal based on the 2-2 pull-down mode is output by an external operation.

* * * * *